United States Patent Office 3,338,450
Patented Aug. 29, 1967

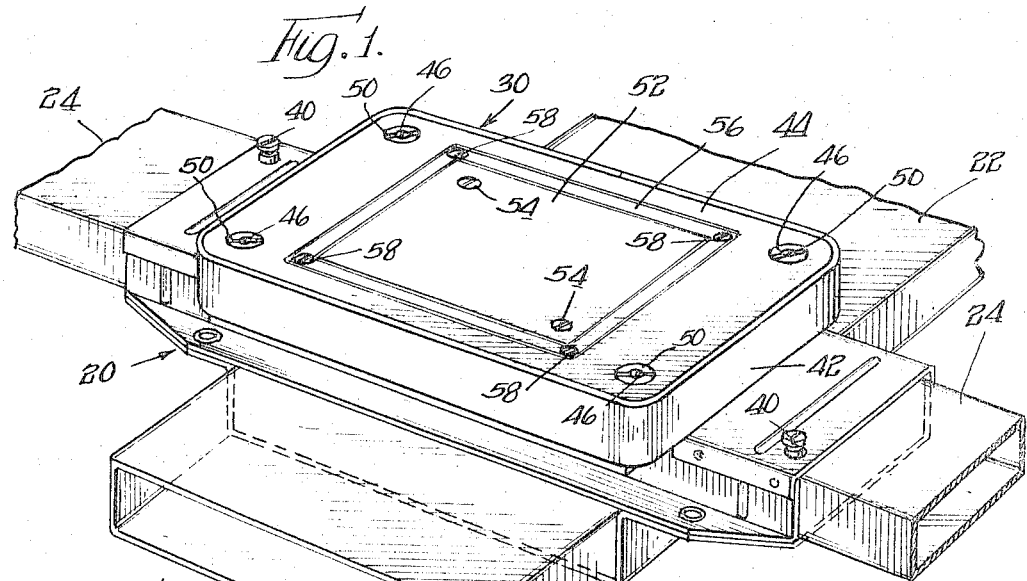
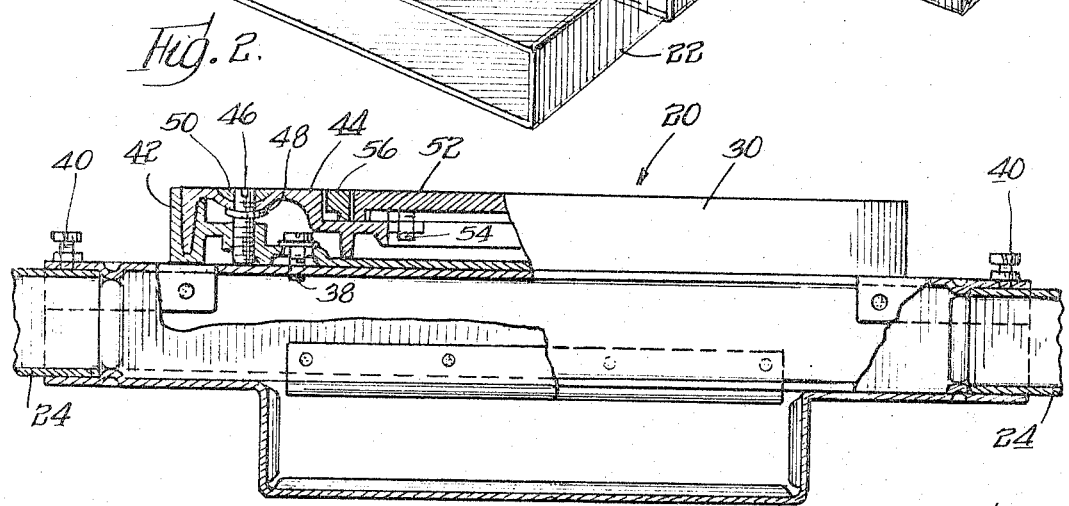
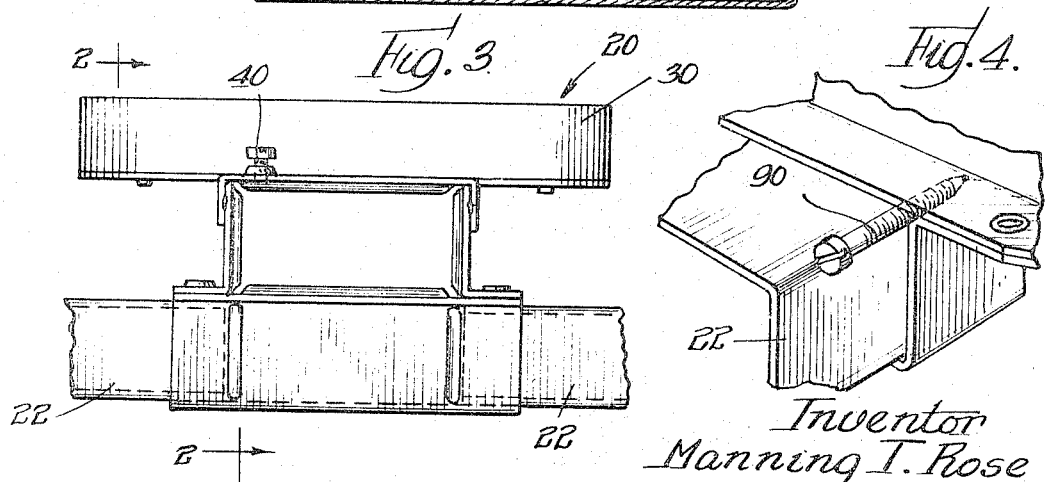

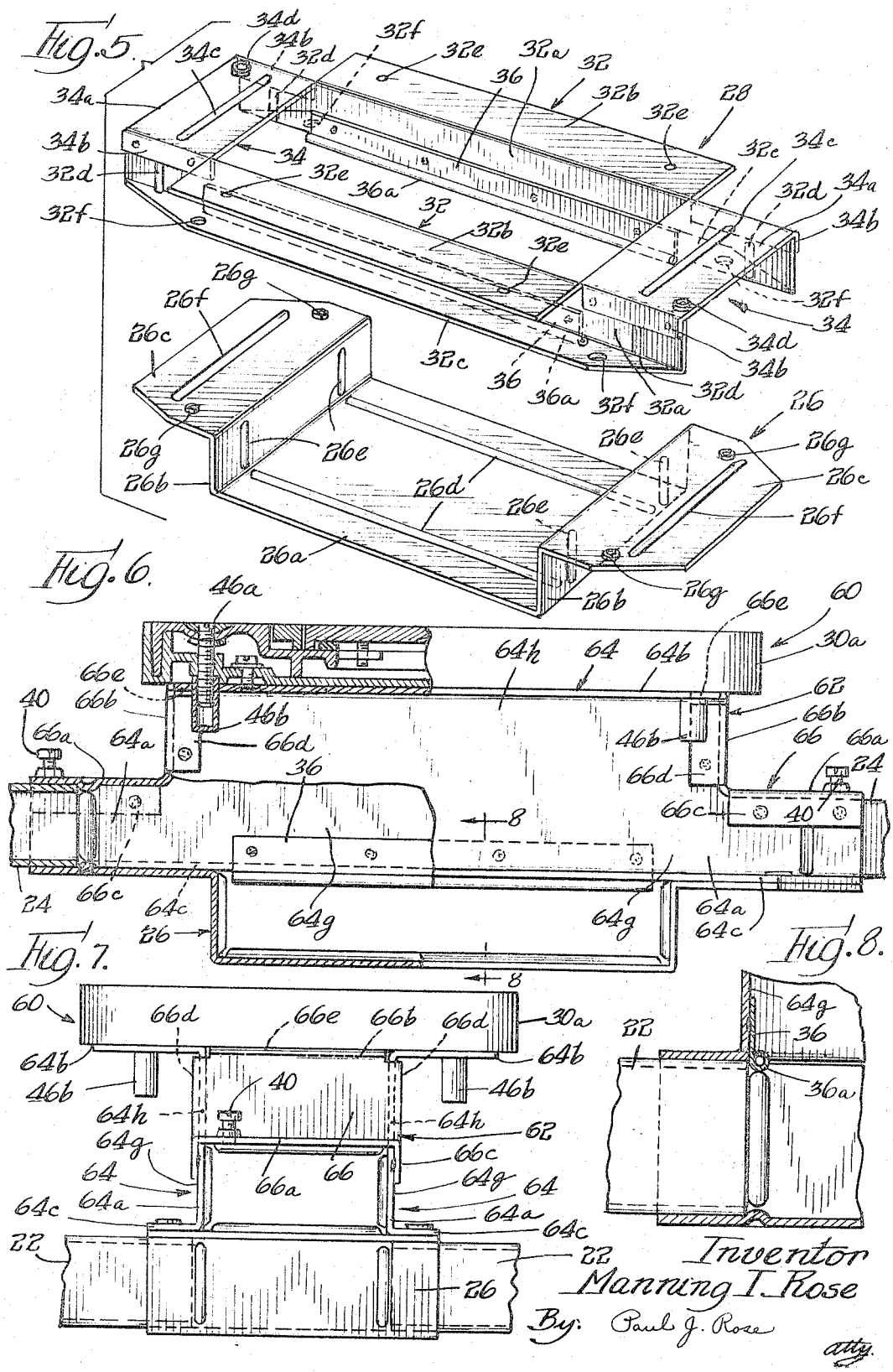

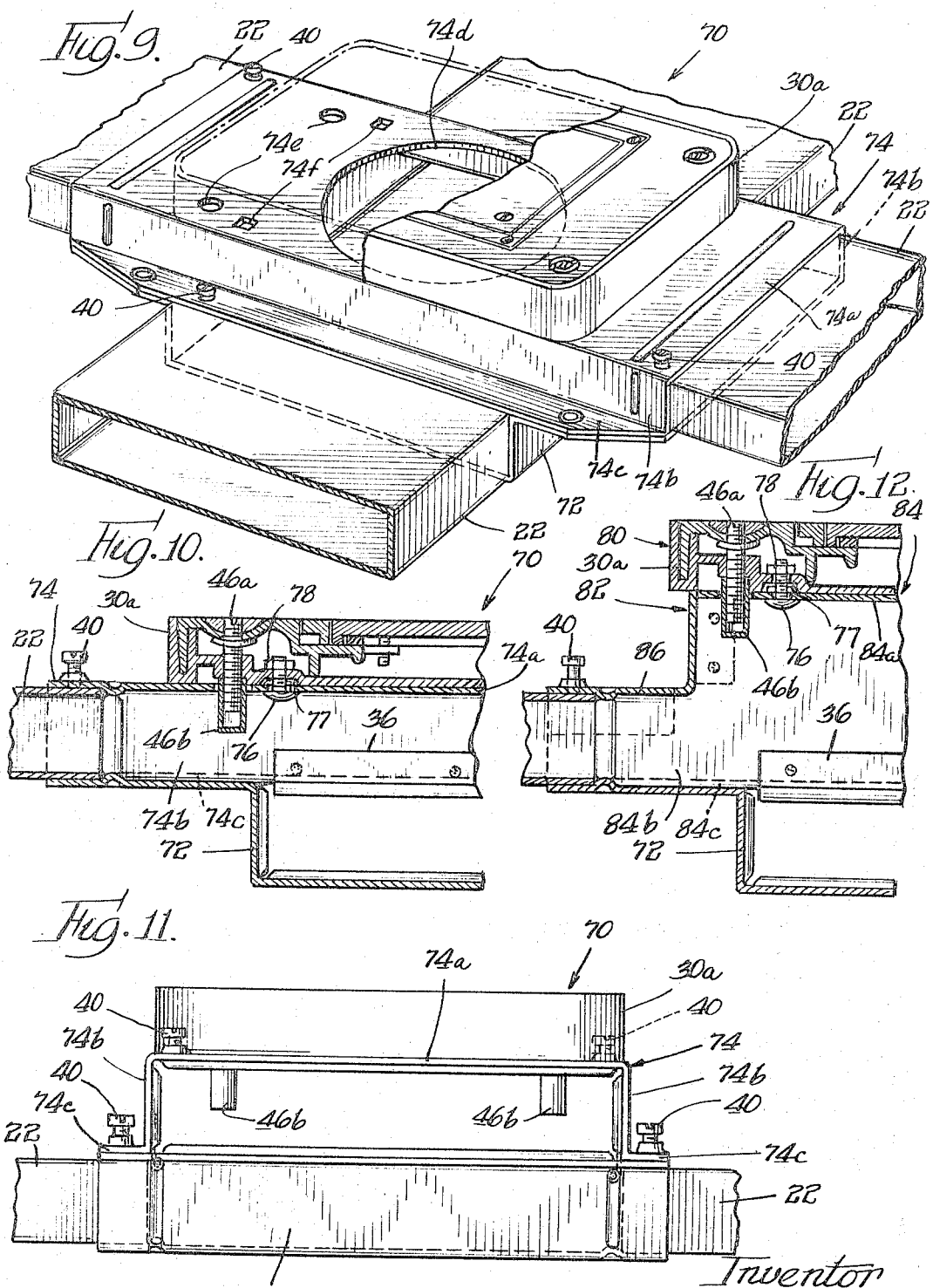

3,338,450
JUNCTION BOX FOR UNDERFLOOR WIRING DUCT AND METHOD OF MAKING
Manning I. Rose, Lexington, Ky., assignor to Square D Company, Park Ridge, Ill., a corporation of Michigan
Filed Aug. 31, 1965, Ser. No. 484,072
19 Claims. (Cl. 220—3.94)

This invention relates generally to junction boxes for underfloor wiring duct, and more particularly to junction boxes for interconnecting a pair of horizontal duct runs extending perpendicularly to each other at different levels.

An object of the invention is to provide a junction box of simple and economical construction.

Another object is to provide a junction box formed of a relatively small number of stamped sheet metal parts which can be easily spot welded together.

Still another object is to provide an improved method of providing a ground connection between a section of underfloor wiring duct and a junction box.

Junction boxes constructed in accordance with the invention may be adapted to receive duct runs having different thicknesses of concrete floor laid over them, and the portions of the junction boxes for receiving the upper duct runs may be adapted to receive duct sections of different widths. Four modifications are shown in the drawings.

FIG. 1 is a perspective view of a junction box constructed in accordance with the invention and having end portions of duct sections installed therein, the upper duct sections being relatively narrow and adapted to have a relatively thin section of concrete floor disposed thereover;

FIG. 2 is a partially sectional view of the junction box of FIG. 1 taken generally along the line 2—2 of FIG 3.;

FIG. 3 is an elevational view of the junction box of FIG. 1 taken from the right-hand side of FIG. 2, the upper duct sections being omitted;

FIG. 4 is a fragmentary perspective view showing a novel method of providing a ground connection between a duct section and a junction box constructed in accordance with the invention;

FIG. 5 is a partially exploded perspective view of the junction box of FIG. 1, the access unit being omitted;

FIG. 6 is a view similar to FIG. 2, but showing an alternative embodiment of the invention wherein the access unit has been raised with respect to the openings for receiving the upper duct sections to permit a relatively thick section of concrete floor to be disposed over the upper duct sections;

FIG. 7 is a view similar to FIG. 3, but showing the embodiment of FIG. 6;

FIG. 8 is a fragmentary sectional view taken along the line 8—8 of FIG. 6;

FIG. 9 is a perspective view similar to FIG. 1, but showing another alternative embodiment of the invention wherein the openings for receiving the upper duct sections are large enough to receive relatively wide duct sections, the access unit being partially broken away and shown in phantom;

FIG. 10 is a fragmentary sectional view of the junction box of FIG. 9 taken generally along the line 10—10 of FIG. 11;

FIG. 11 is a view similar to FIG. 3, but showing the embodiment of FIG. 9; and

FIG. 12 is a view similar to FIG. 10, but showing another alternative embodiment of the invention wherein the access unit has been raised with respect to the openings for receiving the upper duct sections to permit a relatively thick section of concrete floor to be disposed over the upper duct sections.

Referring to the drawings, FIGS. 1–3 and 5 illustrate a junction box 20 in which end portions of a pair of relatively wide duct sections 22 may be received at a first lower level and in which end portions of a pair of relatively narrow duct sections 24 may be received at a second upper level. The junction box 20 includes a lower level body portion 26 (FIG. 5), an upper level body portion 28, and an access unit 30.

The body portion 26 is stamped in one piece from sheet steel and formed into a modified channel cross sectional shape so as to include a bottom portion 26a and a pair of opposed side portions 26b, the free ends of the side portions 26b being bent outwardly to provide a pair of flange portions 26c extending generally parallel to the bottom portion 26a.

The bottom portion 26a is provided with a pair of upwardly projecting beaded portions 26d which serve as stops for the bottom wall portions of the respective duct sections 22, and each of the side portions 26b is provided with a pair of inwardly projecting beaded portions 26e which serve as stops for the respective side wall portions of the duct sections 22. Each of the flange portions 26c is provided with an upwardly projecting beaded portion 26f which serves as a stop for the bottom wall portion of the respective duct sections 24. Further, each flange portion 26c is provided with a pair of holes defined respectively by a pair of internally threaded extruded portions 26g in which mounting legs (not shown) may be received.

The body portion 28 is formed by spot welding a plurality of stamped pieces together and includes a pair of side pieces 32 and a pair of end pieces 34. Preferably, the body portion 28 also includes a pair of stop pieces 36 spot welded respectively to the side pieces 32 and having beaded edge portions 36a which serve as stops for the top wall portions of the respective duct sections 22. Each side piece 32 is generally J-shaped in cross-section and has an elongated side portion 32a, a relatively wide upper flange 32b the opposite ends of which terminate respectively at the inner ends of the end pieces 34, and a relatively narrow lower flange 32c, the opposite end portions of which taper inwardly to the ends of the respective side portion 32a and are spot welded respectively to correspondingly tapered portions of the flange portions 26c.

Each side portion 32a is provided with a pair of inwardly projecting beaded portions 32d which serve as stops for the respective side wall portions of the duct sections 24. Each flange 32b is provided with a pair of holes 32e for respectively receiving a pair of screws such as a screw 38 (FIG. 2), four of the screws 38 being used to secure the access unit 30 to the flanges 32b. Each flange 32c is provided with a pair of holes 32f for receiving the respective extruded portions 26g.

Each end piece 34 includes a top portion 34a and a pair of side flanges 34b, the side flanges 34b being spot welded to the respective side portions 32a. Each top portion 34a is provided with a downwardly projecting beaded portion 34c which serves as a stop for the top wall portion of the respective duct section 24 and with a hole 34d for receiving a grounding screw 40.

The access unit 30 includes a body 42 having an opening in the bottom communicating with the space between the side portions 32a and having a peripheral flange with an upwardly facing groove (FIG. 2) for receiving a downwardly extending flange of a cover ring 44 adjustable by means of four leveling screws 46 each having an integral collar 48 and a dish-shaped threaded lock washer 50 flush with the surface of the cover ring 44. A cover plate 52 is removably secured to the cover ring 44 by means of a pair of screws 54 and a tile-edging ring 56 is secured to the cover ring 44 by means of a plurality of screws 58. Both the cover plate 52 and the tile-edging ring 56 are provided with peripheral flanges and are invertible, as explained in U.S. Patent No. 3,029,964, in accordance with whether the concrete floor in which the junction box and duct sections are installed is to be covered with tile.

FIGS. 6–8 disclose a junction box 60 which includes a lower level body portion 26 identical to the lower level body portion 26 of the junction box 20 and an access unit 30a which is identical to the access unit 30 of the junction box 20 except for longer leveling screws 46a and protective sleeves 46b mounted thereon to prevent setting of the screws in a concrete floor poured therearound. A comparison of FIGS. 6 and 7 with FIGS. 2 and 3 shows that the access unit 30a is spaced farther upwardly from its respective lower level body portion 26 than the access unit 30 is spaced from its respective lower level body portion 26, the junction box 60 thus being adapted for installation in a thicker concrete floor than the junction box 20. An upper level body portion 62 of the junction box 60 is higher than the upper level body portion 28 of the junction box 20. The body portion 62 is formed by spot welding a plurality of stamped metal pieces together in much the same manner as the body portion 28, but four pieces of the body portion 62 are shaped differently from the corresponding pieces of the body portion 28. The body portion 62 includes a pair of side pieces 64 and a pair of end pieces 66. Preferably, the body portion 62 also includes a pair of stop pieces 36 identical to those of the junction box 20 and spot welded respectively to the side pieces 64. Each side piece 64 includes a side portion 64a, an upper flange 64b identical to the flanges 32b of the junction box 20, and a lower flange 64c identical to the flanges 32c. Each side portion 64a includes a lower portion 64g identical to the side portions 32a, and in addition includes an upwardly extending portion 64h which is coextensive with and sets its respective flange 64b up higher than the flanges 32c.

Each end piece 66 includes a horizontally extending flanged portion 66a similar to the end pieces 34 and a vertically extending flanged portion 66b, a pair of opposed flanges 66c on the portion 66a being spot welded respectively to the lower portions 64g of the side portions 64a, and a pair of opposed flanges 66d on the portion 66b being spot welded respectively to the upper portions 64h of the side portions 64a. At the upper end of the respective portions 66b, each end piece 66 is provided with a horizontally extending flange 66e which extends between the side pieces 64 and along with the upper flanges 64b completes a platform for the access unit 30a.

FIGS. 9–11 disclose a junction box 70 in which the relatively wide duct sections 22 may be received at both the upper and lower levels, the junction box 70 being adapted for installation in a relatively thin concrete floor. The junction box 70 includes a lower level body portion 72 similar to the lower level body portion 26 of the junction box 20 (FIG. 5) but longer than the body portion 26 in the direction of reception of the duct sections 22 at the lower level, an access unit 30a identical to the access unit 30a of the junction box 60, and an upper level body portion 74.

The body portion 74 is stamped in one piece from sheet steel and formed into a modified channel cross sectional shape so as to include a top portion 74a and a pair of opposed side portions 74b, the free ends of the side portions 74b being bent outwardly to provide a pair of flange portions 74c extending generally parallel to the top portion 74a and spot welded to flanges provided on the body portion 72. Preferably, a pair of the stop pieces 36 are welded respectively to the side portions 74b.

The top portion 74a is provided with a large hole 74d opening to the access unit 30a. In addition, the top portion 74a is provided with four spaced holes 74e (FIG. 9, only two being shown) for reception of the leveling screws 46a, and with four spaced square holes 74f (FIG. 9, only two being shown) for the reception respectively of four bolts 76 (FIG. 10, only one being shown) which, together with respective spring washers 77 and nuts 78, secure the access unit 30a in position on the top portion 74a.

FIG. 12 discloses a junction box 80 similar to the junction box 70, but adapted for installation in a relatively thick concrete floor. The junction box 80 includes a lower level body portion 72 and an access unit 30a which are respectively identical with the body portion 72 and access unit 30a of the junction box 70. A comparison of FIGS. 10 and 12 shows that the access unit 30a of the junction box 80 is spaced farther upwardly from its respective lower level body portion 72 than the access unit 30a of the junction box 70 is spaced from its respective lower level body portion 72. To secure this additional spacing, an upper level body portion 82 of the junction box 80 is made higher than the upper level body portion 74 of the junction box 70. The body portion 82 includes a main body portion 84 and a pair of end pieces 86, in addition to a pair of stop pieces 36. each end piece 86 is similar to the end pieces 66 of the junction box 60, but is wider than the end pieces 66 so as to be able to accommodate one of the relatively wide duct sections 22, and has no upper flange such as the flange 66e. The main body portion 84 includes a top portion 84a identical to the top portion 74a, a pair of opposed side portions 84b, and a pair of flange portions 84c identical to the flange portions 74c of the junction box 70. The side portions 84b may be identical in shape to the side portions 64a of the side pieces 64 of the junction box 60.

FIG. 4 discloses a novel method of providing a ground connection between a duct section and a junction box. In two-level junction boxes such as the junction box 20 of FIGS. 1–3 and the junction box 60 of FIGS. 6–8, wherein the access units 30 and 30a respectively overhang the flanges 32c and 64c, a grounding screw such as the grounding screw 40 for the upper level duct sections 24 would be inaccessible, without an offset screwdriver, if provided for the lower level duct sections 22. Therefore, as shown in FIG. 4, a longer grounding screw 90 may conveniently be driven between the duct section 22 and the junction box. Further, a grounding screw 90 may also be used in place of a grounding screw 40 at the upper level duct section 24, the grounding screw 90 being secured in place with one blow of a hammer and affording a positive ground connection where the screw threads scrape through the paint on the duct section and junction box.

Each of the junction boxes 20, 60, 70, and 80 includes a top platform portion for the respective access unit 30 or 30a. Thus, in the junction box 20, a top platform portion is formed by the flanges 32b of the side pieces 32 and the top portions 34a of the end pieces 34. In the junction box 60, a top platform is formed by the flanges 64b of the side pieces 64 and the flanges 66e of the end pieces 66. In the junction boxes 70 and 80, top platform portions are formed respectively by the top portions 74a and 84a of the body portions 74 and 84.

I claim:
1. A method of making a junction box for interconnecting a pair of horizontal underfloor wiring duct runs extending perpendicularly to each other at upper and lower levels, said method comprising:
(a) stamping a lower level body portion in one piece from sheet steel and forming it into a modified channel cross sectional shape so as to provide it with a generally flat bottom portion, a pair of side portions extending generally perpendicularly upwardly from said bottom portion, and a pair of flange portions extending generally perpendicularly outwardly respectively from said side portions,
(b) forming an upper level body portion from sheet steel so as to provide it with a top platform portion, a pair of spaced side portions extending generally perpendicularly downwardly from said top platform portion, and a pair of flange portions extending generally perpendicularly outwardly respectively from said side portions, (c) securing the flange portions of said lower level and upper level body portions together with the side portions of said lower level and upper level body portions respectively extending generally perpendicularly to each other, and (d) securing an access unit to said top platform portion of said upper level body portion by threaded fastening means.

2. A method of making a junction box as claimed in claim 1, wherein the forming of said upper level body portion includes spot welding a pair of stop pieces respectively to the inner surfaces of said side portions to serve as stops for the top wall portions respectively of a pair of duct sections of said lower level duct run.

3. A method of making a junction box as claimed in claim 1, wherein the forming of said lower level body portion includes providing said bottom portion with a pair of spaced upwardly projecting bead portions to serve as stops for the bottom wall portions respectively of a pair of duct sections of said lower level duct run.

4. A method of making a junction box as claimed in claim 1, wherein the forming of said lower level body portion includes providing said flange portions respectively with a pair of upwardly projecting bead portions to serve as stops for the bottom wall portions respectively of a pair of duct sections of said upper level duct run.

5. A method of making a junction box as claimed in claim 1, wherein the forming of said upper level body portion includes providing said top platform portion with a pair of spaced downwardly projecting bead portions to serve as stops for the top wall portions respectively of a pair of duct sections of said upper level duct run.

6. A method of making a junction box as claimed in claim 1, wherein the forming of said lower level body portion includes providing each of said side portions with a pair of spaced inwardly projecting bead portions to serve as stops for respective side wall portions of a pair of duct sections of said lower level duct run.

7. A method of making a junction box as claimed in claim 1, wherein the forming of said upper level body portion includes providing each of said side portions with a pair of spaced inwardly projecting bead portions to serve as stops for respective side wall portions of a pair of duct sections of said upper level duct run.

8. A method of making a junction box as claimed in claim 1, wherein the forming of said lower level body portion includes providing said bottom portion with a pair of spaced upwardly projecting bead portions to serve as stops for the bottom wall portions respectively of a pair of duct sections of said lower level duct run and providing said flange portions respectively with a pair of upwardly projecting bead portions to serve as stops for the bottom wall portions respectively of a pair of duct sections of said upper level duct run, and wherein the forming of said upper level body portion includes providing said top platform portion with a pair of spaced downwardly projecting bead portions to serve as stops for the top wall portions respectively of said duct sections of said upper level duct run and spot welding a pair of stop pieces respectively to the inner surfaces of said side portions to serve as stops for the top wall portions respectively of said duct sections of said lower level duct run.

9. A method of making a junction box as claimed in claim 1, wherein the forming of said lower level body portion includes providing said bottom portion with a pair of spaced inwardly projecting bead portions to serve as stops for the bottom wall portions respectively of a pair of duct sections of said lower level duct run, providing each of said side portions with a pair of spaced inwardly projecting bead portions to serve as stops for respective side wall portions of said duct sections of said lower level duct run, and providing said flange portions respectively with a pair of upwardly projecting bead portions to serve as stops for the bottom wall portions respectively of a pair of duct sections of said upper level duct run, and wherein the forming of said upper level body portion includes providing said top platform portion with a pair of spaced downwardly projecting bead portions to serve as stops for the top wall portions respectively of said duct sections of said upper level duct run, providing each of said side portions with a pair of spaced inwardly projecting bead portions to serve as stops for respective side wall portions of said duct sections of said upper level duct run, and spot welding a pair of stop pieces respectively to the inner surfaces of said side portions to serve as stops for the top wall portions respectively of said duct sections of said lower level duct run.

10. A method of making a junction box as claimed in claim 1, wherein the forming of said upper level body portion includes stamping thereof in one piece from sheet steel.

11. A method of making a junction box as claimed in claim 10, wherein the forming of said upper level body portion additionally includes spot welding a pair of stop pieces respectively to the inner surfaces of said side portions to serve as stops for the top wall portions respectively of a pair of duct sections of said lower level duct run.

12. A method of making a junction box as claimed in claim 1, wherein the forming of said upper level body portion includes stamping a pair of side pieces from sheet steel and stamping a pair of end pieces from sheet steel and spot welding said side pieces and end pieces together.

13. A method of making a junction box as claimed in claim 12, wherein the forming of said upper level body portion additionally includes spot welding a pair of stop pieces respectively to said side pieces to serve as stops for the top wall portions respectively of a pair of duct sections of said lower level duct run.

14. A junction box for interconnecting a pair of horizontal underfloor wiring duct runs extending perpendicularly to each other at upper and lower levels, said junction box comprising:

(a) a one-piece lower level body portion formed of sheet steel and having a modified channel cross sectional shape including a generally flat bottom portion, a pair of side portions extending generally perpendicularly upwardly from said bottom portion, and a pair of flange portions extending generally perpendicularly outwardly respectively from said side portions, (b) an upper level body portion formed of sheet steel and including a top platform portion, a pair of spaced side portions extending generally perpendicularly downwardly from said top platform portion, and a pair of flange portions extending generally perpendicularly outwardly respectively from said side portions, the side portions of said upper level and lower level body portions respectively extending generally perpendicularly to each other and opposite end portions of the flange portions of said upper level and lower level body portions respectively being secured to each other, and (c) an access unit secured to said top platform portion of said upper level body portion by threaded fastening means.

15. A junction box as claimed in claim 14, including a pair of stop pieces respectively secured to the inner surfaces of said side portions of said upper level body portion to serve as stops for the top wall portions respectively of a pair of duct sections of said lower level duct run.

16. A junction box as claimed in claim 14, including a pair of spaced upwardly projecting bead portions integrally formed on said bottom portion of said lower level body portion to serve as stops for the bottom wall portions respectively of a pair of duct sections of said lower level duct run.

17. A junction box as claimed in claim 14, including a pair of upwardly projecting bead portions integrally formed respectively on said flange portions of said lower level body portion to serve as stops for the bottom wall portions respectively of a pair of duct sections of said upper level duct run.

18. A junction box as claimed in claim 14, including a pair of spaced downwardly projecting bead portions integrally formed on said top platform portion of said upper level body portion to serve as stops for the top wall portions respectively of a pair of duct sections of said upper level duct run.

19. A junction box as claimed in claim 14, including a pair of stop pieces respectively secured to the inner surfaces of said side portions of said upper level body portion to serve as stops for the top wall portions respectively of a pair of duct sections of said lower level duct run, a pair of spaced upwardly projecting bead portions integrally formed on said bottom portion of said lower level body portion to serve as stops for the bottom wall portions respectively of said pair of duct sections of said lower level duct run, a pair of upwardly projecting bead portions integrally formed respectively on said flange portions of said lower level body portion to serve as stops for the bottom wall portions respectively of a pair of duct sections of said upper level duct run, and a pair of spaced downwardly projecting bead portions integrally formed on said top platform portion of said upper level body portion to serve as stops for the top wall portions respectively of said pair of duct sections of said upper level duct run.

No references cited.

THERON E. CONDON, *Primary Examiner.*

JAMES R. GARRETT, *Examiner.*